(12) United States Patent
Ramsden et al.

(10) Patent No.: US 8,503,311 B2
(45) Date of Patent: Aug. 6, 2013

(54) METHOD FOR MEASURING PROCESSING DELAYS OF VOICE-OVER IP DEVICES

(75) Inventors: David Ramsden, Wall, NJ (US);
Wallace F. Smith, Sea Girt, NJ (US)

(73) Assignee: AT & T Intellectual Property I, L.P., Atlanta, GA (US)

( * ) Notice: Subject to any disclaimer, the term of this patent is extended or adjusted under 35 U.S.C. 154(b) by 1249 days.

(21) Appl. No.: 12/329,172

(22) Filed: Dec. 5, 2008

(65) Prior Publication Data

US 2010/0142513 A1    Jun. 10, 2010

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)

(52) U.S. Cl.
USPC .......................... 370/241; 370/352; 370/356

(58) Field of Classification Search
None
See application file for complete search history.

(56) References Cited

U.S. PATENT DOCUMENTS

| 2004/0165570 A1* | 8/2004 | Lee ............................... 370/349 |
| 2004/0215448 A1* | 10/2004 | Funatsu et al. ................ 704/201 |

\* cited by examiner

*Primary Examiner* — Asad Nawaz
*Assistant Examiner* — Justin N Mullen
(74) *Attorney, Agent, or Firm* — Fay Kaplun & Marcin, LLP.

(57) ABSTRACT

A system and method for recording analog signals exchanged between a telephone device and a VoIP device, capturing packets exchanged between the VoIP device and an IP network, determining analog time values corresponding to analog characteristics of the analog signals, determining digital time values corresponding to digital characteristics of the packets, determining a common reference time for the analog time values and digital time values and determining a processing delay based on the analog time values and the digital time values.

16 Claims, 6 Drawing Sheets

FIG. 4A

| | RG_PDD_offnet.cap – Wireshark | | | | – □ X |
|---|---|---|---|---|---|
| File Edit View Go Capture Analyze Statistics Help | | | | | |
| File: ▽ Expression.. Clear Apply | | | | | |

| NO. | TIME | SOURCE | DESTINATION | PROTOCOL | INFO |
|---|---|---|---|---|---|
| 44 | 56.765135 | 12.160.180.161 | 10.194.6.4 | SIP/SDP | Request: INVITE sip:3143455542@ims.sbc.com with session |
| 45 | 56.819592 | 10.194.6.4 | 12.160.180.161 | SIP | Status: 100 Trying |
| 46 | 56.828804 | 10.194.6.4 | 12.160.180.161 | SIP | Status: 407 Proxy Authentication Required |
| 47 | 56.978780 | 12.160.180.161 | 10.194.6.4 | SIP | Request: ACK sip:3143455542@ims.sbc.com |
| 48 | 56.985363 | 12.160.180.161 | 10.194.6.4 | SIP/SDP | Request: INVITE sip:3143455542@ims.sbc.com with session |
| 49 | 57.039869 | 10.194.6.4 | 12.160.180.161 | SIP | Status: 100 Trying |
| 50 | 57.677910 | 12.160.180.161 | 12.160.180.161 | DNS | Standard query response. No such name |
| 51 | 57.777602 | 10.194.6.4 | 12.160.180.161 | RTP | PT=ITU G.71 PCMU, SSRC=0x14CA8E41, Seq=60950 Time=6103 |
| 52 | 57.797681 | 10.194.6.4 | 12.160.180.161 | RTP | PT=ITU G.71 PCMU, SSRC=0x14CASE41, Seq=60951 Time=6119 |
| 53 | 57.807367 | 10.194.6.4 | 12.160.180.161 | SIP/SDP | Status: 183 Session Progress, with session description |
| 54 | 57.817680 | 10.194.6.4 | 12.160.180.161 | RTP | PT=ITU G.71 PCMU, SSRC=0x14CASE41, Seq=60952 Time=6135 |
| 55 | 57.837697 | 10.194.6.4 | 12.160.180.161 | RTP | PT=ITU G.71 PCMU, SSRC=0x14CASE41, Seq=60953 Time=6151 |
| 56 | 57.857655 | 10.194.6.4 | 12.160.180.161 | RTP | PT=ITU G.71 PCMU, SSRC=0x14CASE41, Seq=60954 Time=6167 |
| 57 | 57.877674 | 10.194.6.4 | 12.160.180.161 | RTP | PT=ITU G.71 PCMU, SSRC=0x14CASE41, Seq=60955 Time=6183 |
| 58 | 57.897694 | 10.194.6.4 | 12.160.180.161 | RTP | PT=ITU G.71 PCMU, SSRC=0x14CASE41, Seq=60956 Time=6199 |
| 59 | 57.917709 | 10.194.6.4 | 12.160.180.161 | RTP | PT=ITU G.71 PCMU, SSRC=0x14CASE41, Seq=60957 Time=6215 |
| 60 | 57.937670 | 10.194.6.4 | 12.160.180.161 | RTP | PT=ITU G.71 PCMU, SSRC=0x14CASE41, Seq=60958 Time=6231 |
| 61 | 57.957688 | 10.194.6.4 | 12.160.180.161 | RTP | PT=ITU G.71 PCMU, SSRC=0x14CASE41, Seq=60959 Time=6247 |
| 62 | 57.977706 | 10.194.6.4 | 12.160.180.161 | RTP | PT=ITU G.71 PCMU, SSRC=0x14CASE41, Seq=60960 Time=6263 |
| 63 | 57.993185 | 12.160.180.161 | 10.194.6.4 | RTP | PT=ITU G.71 PCMU, SSRC=0x5CB00392, Seq=27477 Time=1966 |
| 64 | 57.997683 | 10.194.6.4 | 12.160.180.161 | RTP | PT=ITU G.71 PCMU, SSRC=0x14CASE41, Seq=60961 Time=6279 |

.... 0000 = Contributing source identifiers count: 0
0 .... .... = Marker: False
Payload type: ITU-T G.711 PCMU (0)
Sequence number: 60950
[Extended sequence number: 60950]
Timestamp: 61030
Synchronization Source identifier: 0x14ca8e41(3488190009)
Payload: F9F9F9F9F9F9F9F9F9F9F9F9F9F9F9F9F9F9.....

```
0030    ee 66 14 ca 8e e1 41 f9 f9 f9 f9 f9 f9 f9 f9       .f...A.........
0040    f9 f9 f9 f9 f9 f6 f9 f9 f9 f9 f9 f9 f9 f9 f9
0050    f9 f9 f9 f9 f9 7e f9 f9 f9 f9 f9 f9 f9 f9 f9
006     f9 f9 f9 f9 f9 66 f9 f9 f9 f9 f9 f9 f9 f9
0070    f9 f9 f9 f9 f9 da f9 f9 f9 f9 f9 fa f9 f9 f9
0080    fb fb fb fb fb 56 fb fc fd fd fd fc fd fd fd
0090    fd fc fc fc fc dc fc fc fc fc fc fc fc fc fc
00a0    fc fc fc fc fd e8 fd fd fd fd fd fd fc fd fd
00b0    fd fd fd fd fc c8 fc fc fc fc fc fc fc fc fc
00c0    fc fc fd fd fd 48 fc fc fc fc fc fd fc fc fc
```

Payload (rtp.payload), 160 bytes    P: 1250 D: 1250 M: 0

FIG. 4B

| RG_PDD_offnet.cap - Wireshark | | | | |
|---|---|---|---|---|
| File Edit View Go Capture Analyze Statistics Help | | | | |
| File: ▽ Expression.. Clear Apply | | | | |
| NO. | TIME | SOURCE | DESTINATION | PROTOCOL INFO |
| 630 | 63.573669 | 12.160.180.161 | 10.194.6.4 | RTP PT=ITU-T G, 71 PCMU, SSRC=0x5CB00392, Seq=27756 Time=1966 |
| 631 | 63.577799 | 10.194.6.4 | 12.160.180.161 | RTP PT=ITU-T G, 71 PCMU, SSRC=0x14CA8E41, Seq=61240 Time=1074 |
| 632 | 63.593562 | 12.160.180.161 | 10.194.6.4 | RTP PT=ITU-T G, 71 PCMU, SSRC=0x5CB00392, Seq=27757 Time=1966 |
| 633 | 63.597659 | 10.194.6.4 | 12.160.180.161 | RTP PT=ITU-T G, 71 PCMU, SSRC=0x14CA8E41, Seq=61241 Time=1075 |
| 634 | 63.613616 | 12.160.180.161 | 10.194.6.4 | RTP PT=ITU-T G, 71 PCMU, SSRC=0x5CB00392, Seq=27758 Time=1966 |
| 635 | 63.617637 | 10.194.6.4 | 12.160.180.161 | RTP PT=ITU-T G, 71 PCMU, SSRC=0x14CA8E41, Seq=61242 Time=1077 |
| 636 | 63.633672 | 12.160.180.161 | 10.194.6.4 | RTP PT=ITU-T G, 71 PCMU, SSRC=0x5CB00392, Seq=27759 Time=1966 |
| 637 | 63.637672 | 10.194.6.4 | 12.160.180.161 | RTP PT=ITU-T G, 71 PCMU, SSRC=0x14CA8E41, Seq=61243 Time=1079 |
| 638 | 63.653544 | 12.160.180.161 | 10.194.6.4 | RTP PT=ITU-T G, 71 PCMU, SSRC=0x5CB00392, Seq=27760 Time=1966 |
| 639 | 63.657771 | 10.194.6.4 | 12.160.180.161 | RTP PT=ITU-T G, 71 PCMU, SSRC=0x14CA8E41, Seq=61244 Time=1080 |
| 640 | 63.673584 | 12.160.180.161 | 10.194.6.4 | RTP PT=ITU-T G, 71 PCMU, SSRC=0x5CB00392, Seq=27761 Time=1966 |
| 641 | 63.677629 | 10.194.6.4 | 12.160.180.161 | RTP PT=ITU-T G, 71 PCMU, SSRC=0x14CA8E41, Seq=61245 Time=1082 |
| 642 | 63.693559 | 12.160.180.161 | 10.194.6.4 | RTP PT=ITU-T G, 71 PCMU, SSRC=0x5CB00392, Seq=27762 Time=1966 |
| 643 | 63.697786 | 10.194.6.4 | 12.160.180.161 | RTP PT=ITU-T G, 71 PCMU, SSRC=0x14CA8E41, Seq=61246 Time=1083 |
| 644 | 63.713586 | 12.160.180.161 | 10.194.6.4 | RTP PT=ITU-T G, 71 PCMU, SSRC=0x5CB00392, Seq=27763 Time=1966 |
| 645 | 63.717764 | 10.194.6.4 | 12.160.180.161 | RTP PT=ITU-T G, 71 PCMU, SSRC=0x14CA8E41, Seq=61247 Time=1085 |
| 646 | 63.733672 | 12.160.180.161 | 10.194.6.4 | RTP PT=ITU-T G, 71 PCMU, SSRC=0x5CB00392, Seq=27764 Time=1966 |
| 647 | 63.737800 | 10.194.6.4 | 12.160.180.161 | RTP PT=ITU-T G, 71 PCMU, SSRC=0x14CA8E41, Seq=61248 Time=1087 |
| 648 | 63.753543 | 12.160.180.161 | 10.194.6.4 | RTP PT=ITU-T G, 71 PCMU, SSRC=0x5CB00392, Seq=27765 Time=1966 |
| 649 | 63.757779 | 10.194.6.4 | 12.160.180.161 | RTP PT=ITU-T G, 71 PCMU, SSRC=0x14CA8E41, Seq=61249 Time=1088 |
| 650 | 63.773574 | 12.160.180.161 | 10.194.6.4 | RTP PT=ITU-T G, 71 PCMU, SSRC=0x5CB00392, Seq=27766 Time=1966 |

.... 0000 = Contributing source identifiers count: 0
0 .... .... = Marker: False
Payload type: ITU-T G.711 PCMU (0)
Sequence number: 61240
[Extended sequence number: 61240]
Timestamp: 107430
Synchronization Source identifier: 0x14ca8e41 (348819009)

Payload: 7E7E7E7E7E7E7E7E7E7E7E7E7E7E7E7E7E7E.....

| 0030 | a3 a6 14 ca Se 41 7e 7e 7e 7e 7e 7e 7e 7e 7e 7e | ......A~~~~~~~~~~ |
| 0040 | 7e 7e 7e 7e 7e 7e 7e 7e 7e 7e 7e 7e 7e 7e 7e 7e | ~~~~~~~ ~~~~~~~~~ |
| 0050 | 7e 7e 7e 7e 7e 7e 7e 7e 7e 7e 7e 7e 7e 7e 7e 7e | ~~~~~~~~ ~~~~~~~~ |
| 006  | 7e 7e 7e 7e 7e 7e 7e 7e 7e 7e 7e 7e 7e 7e 7e 7e | ~~~~~~~ ~~~~~~~A. |
| 0070 | 7e 7e 7e 7e 7e 7e 7e 7e 7e 7e 5e e3 ce cb c2 c3 | ~~~~~~ ~~~^A...... |
| 0080 | c5 cd d7 f0 5f 53 4d 4c 4d 50 59 66 fd e8 df dd | ....SML MPYf..... |
| 0090 | de e2 ea f2 fd 7d fe 16 ed e7 e4 e4 ea f8 6b 5e | .....}....... kA |
| 00a0 | 56 4f 4e 4f 53 5e 7d dc ce c9 c4 c4 c6 cd dc 6a | VONOSA}........j |
| 00b0 | 4f 45 4f 3d 3d 41 4a 5f da c7 bd b9 b8 ba be ca | OE7==a)......... |
| 00c0 | f0 4f 3e 38 34 34 37 3d 4d c8 c5 b9 b3 b1 b1 bf | 0>8447=M....... |

Payload (rtp.payload), 160 bytes    P: 1250 D: 1250 M: 0

FIG. 4C

| | RG_PDD_offnet.cap – Wireshark | | | | |
|---|---|---|---|---|---|
| File Edit View Go Capture Analyze Statistics Help | | | | | |
| File: ▽ Expression.. Clear Apply | | | | | |
| NO. | TIME | SOURCE | DESTINATION | PROTOCOL | INFO |
| 791 | 65.137789 | 10.194.6.4 | 12.160.180.161 | RTP | PT=ITU-T G.71 PCMU, SSRC=0x14CA8E41, Seq=61318 Time=1199 |
| 792 | 65.153617 | 12.160.180.161 | 10.194.6.4 | RTP | PT=ITU-T G.71 PCMU, SSRC=0x5CB00392, Seq=27835 Time=1966 |
| 793 | 65.157826 | 10.194.6.4 | 12.160.180.161 | RTP | PT=ITU-T G.71 PCMU, SSRC=0x14CA8E41, Seq=61319 Time=1200 |
| 794 | 65.173607 | 12.160.180.161 | 10.194.6.4 | RTP | PT=ITU-T G.71 PCMU, SSRC=0x5CB00392, Seq=27836 Time=1966 |
| 795 | 65.177870 | 10.194.6.4 | 12.160.180.161 | RTP | PT=ITU-T G.71 PCMU, SSRC=0x14CA8E41, Seq=61320 Time=1202 |
| 796 | 65.193886 | 12.160.180.161 | 10.194.6.4 | RTP | PT=ITU-T G.71 PCMU, SSRC=0x5CB00392, Seq=27837 Time=1966 |
| 797 | 65.107788 | 10.194.6.4 | 12.160.180.161 | RTP | PT=ITU-T G.71 PCMU, SSRC=0x14CA8E41, Seq=61321 Time=1203 |
| 798 | 65.213619 | 12.160.180.161 | 10.194.6.4 | RTP | PT=ITU-T G.71 PCMU, SSRC=0x5CB00392, Seq=27838 Time=1966 |
| 799 | 65.217825 | 10.194.6.4 | 12.160.180.161 | RTP | PT=ITU-T G.71 PCMU, SSRC=0x14CA8E41, Seq=61322 Time=1205 |
| 800 | 65.233591 | 12.160.180.161 | 10.194.6.4 | RTP | PT=ITU-T G.71 PCMU, SSRC=0x5CB00392, Seq=27839 Time=1966 |
| 801 | 65.237802 | 10.194.6.4 | 12.160.180.161 | RTP | PT=ITU-T G.71 PCMU, SSRC=0x14CA8E41, Seq=61323 Time=1207 |
| 802 | 65.253618 | 12.160.180.161 | 10.194.6.4 | RTP | PT=ITU-T G.71 PCMU, SSRC=0x5CB00392, Seq=27840 Time=1966 |
| 803 | 65.257784 | 10.194.6.4 | 12.160.180.161 | RTP | PT=ITU-T G.71 PCMU, SSRC=0x14CA8E41, Seq=61324 Time=1208 |
| 804 | 65.273621 | 12.160.180.161 | 10.194.6.4 | RTP | PT=ITU-T G.71 PCMU, SSRC=0x5CB00392, Seq=27841 Time=1966 |
| 805 | 65.277818 | 10.194.6.4 | 12.160.180.161 | RTP | PT=ITU-T G.71 PCMU, SSRC=0x14CA8E41, Seq=61325 Time=1210 |
| 806 | 65.293601 | 12.160.180.161 | 10.194.6.4 | RTP | PT=ITU-T G.71 PCMU, SSRC=0x5CB00392, Seq=27842 Time=1966 |
| 807 | 65.297797 | 10.194.6.4 | 12.160.180.161 | RTP | PT=ITU-T G.71 PCMU, SSRC=0x14CA8E41, Seq=61326 Time=1211 |
| 808 | 65.313638 | 12.160.180.161 | 10.194.6.4 | RTP | PT=ITU-T G.71 PCMU, SSRC=0x5CB00392, Seq=27843 Time=1966 |
| 809 | 65.317835 | 10.194.6.4 | 12.160.180.161 | RTP | PT=ITU-T G.71 PCMU, SSRC=0x14CA8E41, Seq=61327 Time=1213 |
| 810 | 65.333609 | 12.160.180.161 | 10.194.6.4 | RTP | PT=ITU-T G.71 PCMU, SSRC=0x5CB00392, Seq=27844 Time=1966 |
| 811 | 65.337808 | 10.194.6.4 | 12.160.180.161 | RTP | PT=ITU-T G.71 PCMU, SSRC=0x14CA8E41, Seq=61328 Time=1215 |

.... 0000 = Contributing source identifiers count: 0
0 .... .... = Marker: False
Payload type: ITU-T G.711 PCMU (0)
Sequence number: 27837
[Extended sequence number: 93373]
Timestamp: 1966519009
Synchronization Source identifier: 0x5cb00392 (1555039122)
Payload: F9f7 f4 f2 f2 f1 f1 f1 f0 f1 f3 f6 fA FE 7A75716F6E6E6E6F7274...

| 0030 | 6c bd 75 36 b2 e1 5c b0 03 92 f9 f7 f4 f2 f2 f1 | 1.u6..\. ....... |
| 0040 | f1 f1 f0 f1 f3 f6 fa fe 7a 75 71 6f 6e 6e 6e 6f | ........zuqnnno |
| 0050 | 72 74 77 79 7b 7e ff fc 19 15 14 f3 f3 f3 f3 f6 | rtwy{~.......... |
| 006 | f7 fc 7b 74 6b 66 61 5e 5d 5e 60 6a 78 f4 e6 de | ..{tkfa^]^`jx... |
| 0070 | da d7 d7 d7 d7 da dc df e6 ed f9 73 69 60 5b 58 | ...........si`[X |
| 0080 | 54 51 50 51 53 56 5c 64 70 f5 e6 de da d7 d5 d3 | TQPQSV\dp...... |
| 0090 | d2 d2 d3 d4 d8 dc e6 fb 6b 5f 59 57 56 56 59 5e | ........k_YWVVY^ |
| 00a0 | 65 70 f8 ec e7 e8 fa 6b 5f 53 4f 4f 4e 54 5f 6e | ep.....k_SOONT_n |
| 00b0 | de d5 cd c8 c7 c8 c9 cc d1 d6 db e6 ed f7 6f 65 | ..............oe |
| 00c0 | 5c d4 4e 4d 49 48 48 49 4c 50 57 62 7b e9 dc d6 | \.NMIHHILPWb{... |

Payload (rtp.payload), 160 bytes    P: 1250 D: 1250 M: 0

METHOD FOR MEASURING PROCESSING DELAYS OF VOICE-OVER IP DEVICES

BACKGROUND

Voice-over Internet Protocol (VoIP) is a protocol optimized for the transmission of voice through the Internet or other packet-switched networks. VoIP allows users to use regular telephone networks anywhere through any Internet service provider. VoIP systems carry telephony signals as digital audio encapsulated in a data-packet stream over IP by converting analog audio signals to digital data that can be transmitted over the Internet. VoIP devices (e.g., terminal adapters, SIP phones, Media Gateways) are able to convert analog signals to digital signals encapsulated in the packets to be transmitted over the Internet.

VoIP may experience some time delays as a result of physical distance, the number of router hops, encryption and voice/data conversion. A typical packet will be forwarded over many links via many gateways, each of which will not begin to forward the packet until it has been completely received. Processing delays are incurred while a gateway determines what to do with a newly received packet. Small delays are generally not noticeable by users, but larger delays may result in a degradation of voice quality. Thus, it is desirable to measure processing delays associated with VoIP devices to determine whether processing delays added by VoIP devices are acceptable.

However, current measuring techniques use different tools to measure VoIP performance in the analog and IP domains, which makes it difficult to determine the time it takes for a VoIP device to convert an analog event into an IP event and vice versa. Thus, a method for accurately determining processing delays added by VoIP devices to end-to-end transmission delays and post-dialing delays may be beneficial to determine whether they are degrading the end-to-end performance of VoIP calls. Any company providing VoIP services or developing VoIP products may use the technique to assess the company's equipment performance.

SUMMARY OF THE INVENTION

A method for recording analog signals exchanged between a telephone device and a VoIP device, capturing packets exchanged between the VoIP device and an IP network, determining analog time values corresponding to analog characteristics of the analog signals, determining digital time values corresponding to digital characteristics of the packets, determining a common reference time for the analog time values and digital time values and determining a processing delay based on the analog time values and the digital time values.

A system measuring a processing delay of a VoIP device having a recording device recording analog signals exchanged between a telephone device and the VoIP device, a packet trace device capturing packets transmitted between the VoIP device and an IP network and a processor determining analog time values corresponding to analog characteristics of the analog signals, determining digital time values corresponding to digital characteristics of the packets, determining a common reference time for the analog time values and digital time values and determining a processing delay based on the analog time values and the digital time values.

BRIEF DESCRIPTION OF THE DRAWINGS

FIG. 4A shows a first screen view of an exemplary packet trace according to an exemplary system and method of the present invention.

FIG. 4B shows a second screen view of the exemplary packet trace of FIG. 4A.

FIG. 4C shows a third screen view of the exemplary packet trace of FIG. 4A.

DETAILED DESCRIPTION

Figure 1:
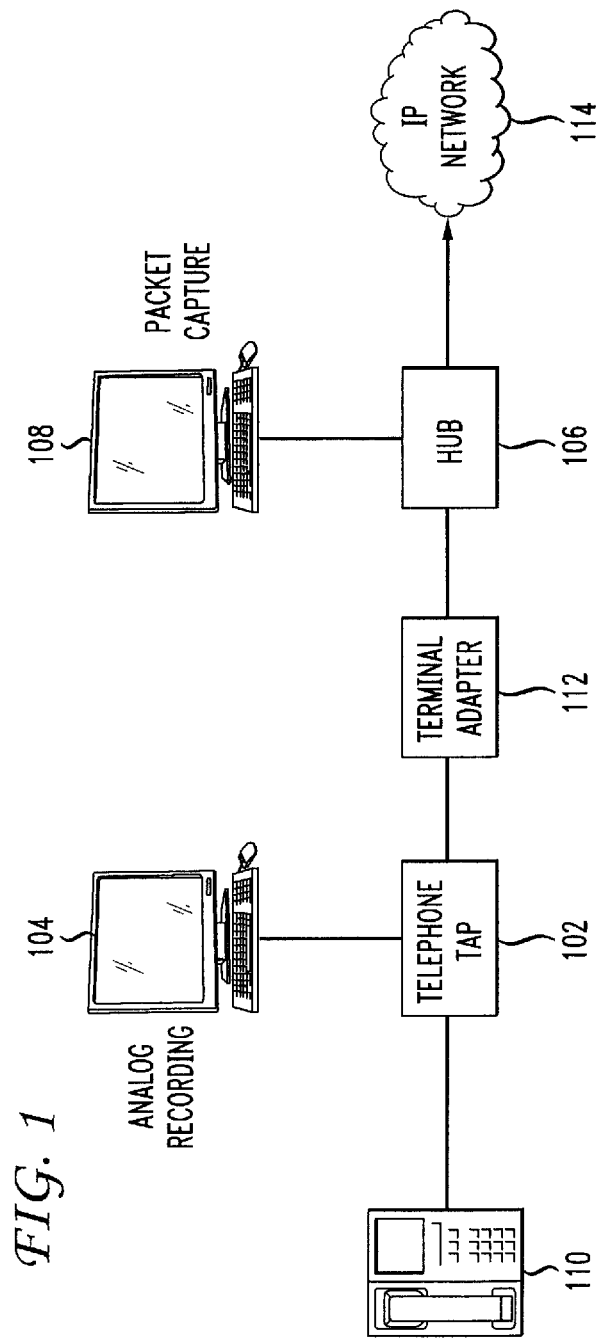
FIG. 1 shows a system for measuring processing delays of VoIP devices according to an exemplary embodiment of the present invention.

The exemplary embodiments may be further understood with reference to the following description and the appended drawings, wherein like elements are referred to with the same reference numerals. The exemplary embodiments relate to a system and method for measuring processing delays associated with VoIP devices. It should be noted that although exemplary embodiments of the present invention show and/or describe measuring the processing delay of a terminal adapter, the system and method of the present invention may be used to measure processing delays of any VoIP device such as, for example, SIP phones, Media Gateways, etc.

As shown in FIG. 1, a system 100 according to an exemplary embodiment of the present invention comprises a recording device 104 and a packet trace tool 108. The recording device 104 is connectable between a telephone network device 110 and a VoIP device 112 via a telephone tap 102 such that the recording device 104 may record an analog signal that is transmitted between the telephone network device 110 and the VoIP device 112. The packet trace tool 108 is connectable between the VoIP device 112 and an IP Network 114 via a hub 106 such that the packet trace tool 108 may take a packet capture of packets transmitted between the VoIP device 112 and the IP Network 114. In the example shown, the telephone network device 110 is a standard telephone while the VoIP device 112 is a terminal adapter. It will be understood by those of skill in the art, however, that any telephone network device 110 and VoIP devices 112 may be used in the present invention. For example, the telephone network device 110 may also be a network switch, a PBX or other similar device. The VoIP device 112 may also be a SIP phone, a Media Gateway or other similar device.

The recording device 104 may be a personal computer, server or other processing arrangement loaded with an audio recording software such as Cool Edit. Once initiated, the recording device 104 records the analog signal transmitted between the telephone network device 110 and the VoIP device 112. The recording device 104 may record the analog signal as a digital soundwave. The recording device 104 is able to access the signal to/from the telephone network device 110 via the telephone tap 102, which monitors the connection between the telephone network device 110 and the VoIP device 112. It will be understood by those of skill in the art that the recording device 104 may include a memory, a display and/or an audio playback device such that the recordings of the analog signal may be stored and/or displayed or played back by a user.

The packet trace tool 108 may be a personal computer, a server or other processing arrangement that is loaded with a packet analyzer such as Wireshark. The packet trace tool 108 allows a user to see all traffic being passed to/from the IP network 114 such that packets being transmitted therebetween may be recorded in a packet capture. As data streams flow across the network 114, the packet trace tool 108 captures each packet and eventually decodes and analyzes its contents. The packet trace tool 108 is able to access the packets passing between the VoIP device 112 and the IP Network 114 via the hub 106, which permits connection of the packet trace tool 108 to both the VoIP device 112 and the IP network 114.

Although the recording device 104 and the packet trace tool 108 are shown as two separate devices, it will understood by those of skill in the art that the recording device 104 and the packet trace tool 108 may be a single device. For example, the recording device 104 and the packet trace tool 108 may be a single personal computer, server or other processing arrangement loaded with both the audio recording software and the packet analysis tool. It will also be understood by those of skill in the art that the recorded analog signals and the recorded packet capture may be transmitted to a processor (not shown) for determining time values that may be used to calculate a processing delay. The processor may be a separate personal computer, server or other processing arrangement connected to both the recording device 104 and the processing tool 108 such that the recorded analog signal and the recorded packet capture may be analyzed. Alternatively, the processor may be a component of one of the recording device 104 and/or the packet trace tool 108.

Figure 2:
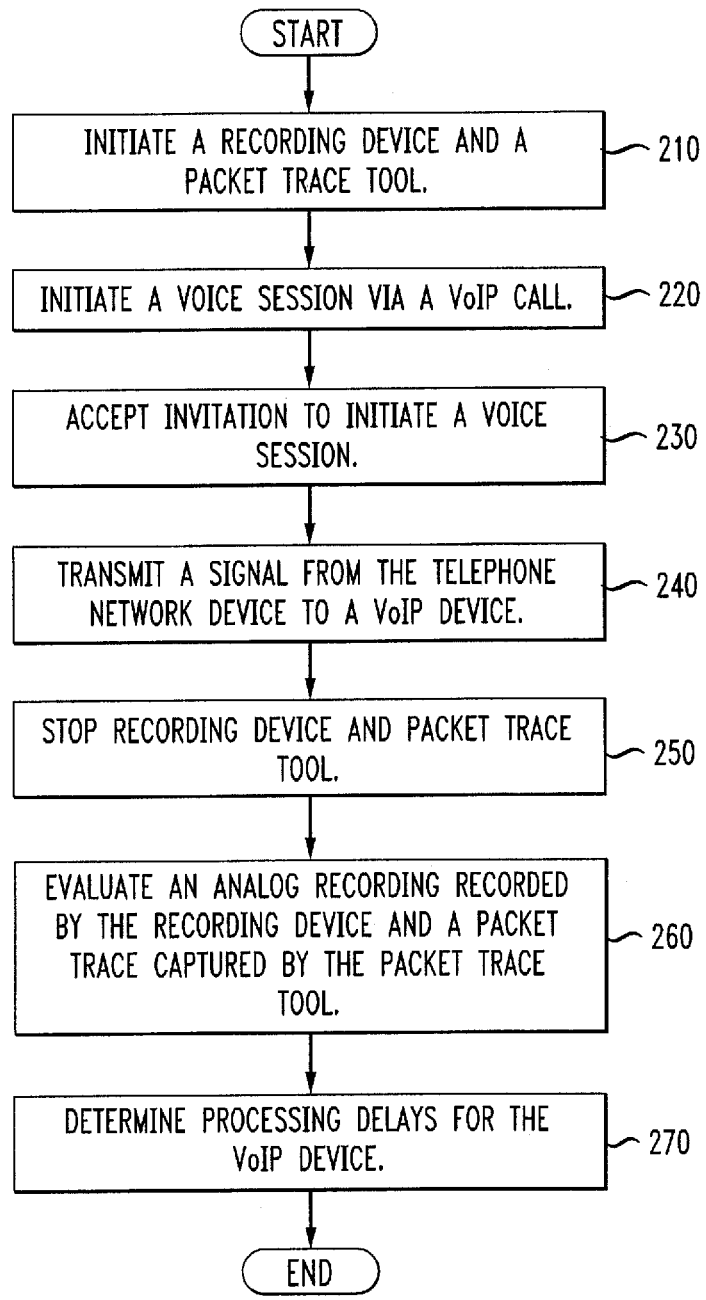
FIG. 2 shows a method for measuring processing delays of VoIP devices according to an exemplary embodiment of the present invention.

FIG. 2 shows an exemplary method 200 according to the present invention, using the system 100, as described above. The method 200 comprises a first step 210 in which the recording device 104 and the packet capture tool 108 are initiated. Upon initiation, the recording device 104 will record all analog signals transmitted between the telephone network device 110 and the VoIP device 112 in an analog recording and the packet trace tool 108 will capture all the data transmitted between the VoIP device 112 and the IP Network 114 in a packet capture. Once the recording device 104 and the packet trace tool 108 have been initiated, a telephone call may be initiated by a first user via the telephone network device 110 (e.g., a telephone) in a step 220. The telephone call is initiated by dialing digits on the telephone network device 110. These dialed digits may be converted to digital packets that are sent via a signaling protocol such as Session Initiation Protocol (SIP). A SIP Invite is sent to a second user, via the IP Network 114, at the telephone number being dialed to invite the second user to establish a voice session. The SIP Invite is transmitted across the network and causes a ringing signal to be sent to the second user. Once ringing begins at a telephone network device of the second user, a digital packet of the ringing signal is transmitted back to the VoIP device 112 to be transmitted to the telephone network device 110 so that the first user may also hear a ringing signal, which would indicate that the call has been connected.

When ringing is heard by the second user, the second user may accept the first user's invitation for a voice session, in a step 230. The invitation may be accepted by answering the phone call upon hearing the phone ringing. Once the voice session has been established, a speech signal may be sent from the telephone network device 110 to the VoIP device 112, in a step 240. The speech signal may be a tone, speech or any other analog signal sent by the first user via the telephone network device 110. The VoIP device 112 then converts the analog speech signal to a packet that may be transmitted using a format such as Real-time Transfer Protocol (RTP). The speech signal may eventually be used to relate times that are recorded by the recording device 104 and the packet trace tool 108. Once the speech signal has been transmitted, the recording device 104 and the packet trace tool 108 may be stopped, in a step 250.

It will be understood by those of skill in the art that the analog recording of the recording device 104 and the packet capture of the packet tracing tool 108 may be saved to a memory of each of the devices 104, 108 and/or displayed on a display of each of the devices 104, 108. Alternatively, the analog recoding and/or the packet capture may be stored and/or displayed on a separate memory and/or display.

In a step 260, the analog recordings of the recording device 104 are evaluated to identify a first time $T_1$, a second time $T_2$ and a third time $T_3$ and the packet trace is evaluated to determined a first time $S_1$, a second time $S_2$ and a third time $S_3$. The times $T_1$, $T_2$ and $T_3$ may be referred to herein as "analog time values" to indicate the times have been derived from the analog signal. Those skilled in the art will understand that other time values may also be derived from the analog signal and these would also be referred to as analog time values. Similarly, $S_1$, $S_2$ and $S_3$ may be referred to as "digital time values" to indicate the times have been derived from the packet trace. For the analog recordings, the first time $T_1$ corresponds to a time in which a final Dual Tone Multi-Frequency (DTMF) digit ended, in other words, when the last digit of the telephone number that is being dialed has been entered. The second time $T_2$ corresponds to a time when the ringing signal starts. The third time $T_3$ corresponds to a time when the transmitted signal starts. For the packet trace, the first time $S_1$ corresponds to a time that the SIP Invite was sent. The second time $S_2$ corresponds to a time when the ringing signal starts. The RTP packets transmitted from the IP Network 114 to the VoIP device 112 may be evaluated to find when the ringing signal starts. The third time $S_3$ corresponds to the time when the transmitted signal starts. The RTP packets transmitted from the VoIP device 112 to the IP Network 114 may be evaluated to find when the speech signal starts.

In a step 270, the time values identified in the step 260 may then be used to determine a processing time of the VoIP device 112 to create the SIP Invite packet, $D_{SIP}$, and a processing time that it takes the VoIP device 112 to convert an RTP packet to an analog signal that is transmitted to the telephone network device 110 in the step 240, $D_{RTPRCV}$. The processing delays $D_{SIP}$ and $D_{RTPRCV}$ may be determined by relating the time values $T_1$, $T_2$, $T_3$ of the analog recording to the time values $S_1$, $S_2$, $S_3$ of the packet capture. The analog recording and the packet trace may be related using the following equations:

$$T_1 + D_{SIP} = S_1 + \Delta \quad (1)$$

$$T_2 = S_2 + D_{RTPRCV} + \Delta \quad (2)$$

$$T_3 + D_{RTPXMT} = S_3 + \Delta \quad (3)$$

Where, $\Delta$ is a difference between when the analog recording and packet captures were started, $D_{SIP}$ is the processing time used by the VoIP device 112 to create the SIP Invite packet, $D_{RTPXMT}$ is a processing time it takes the VoIP device 112 to convert the speech signal received from the phone into the RTP packet and $D_{RTPRCV}$ is the processing time the VoIP device 112 takes to convert the RTP packet into the analog signal that is transmitted.

Using the values of $T_1$, $T_2$, $T_3$, $S_1$, $S_2$ and $S_3$ that are identified by evaluating the analog recording and the packet capture in the equations disclosed above, processing delays of the VoIP device 112 are calculated in the step 270. Specifically, it is possible to calculate $D_{RTPRCV}$, the time it takes the VoIP device 112 to convert an RTP packet into the analog signal, and $D_{SIP}$, the time it takes the VoIP device 112 to create the SIP Invite packet. The value of $D_{RTPXMT}$ may be easily determined within a few ms. For example, if the VoIP device 112 of the system 100 is a terminal adapter that is using 20 ms RTP packets and a G.711 codec, $D_{RTPXMT}$ may be estimated to be approximately 21 ms. Additionally, Δ may be easily eliminated by taking a difference between the first equation and the third equation and a difference between the second equation and the third equation, since the value of $D_{RTPXMT}$, of the third equation, is known.

The difference of the first equation and the third equation would result in an equation that would determine a value of $D_{SIP}$ as follows:

$$D_{SIP}=(T_3-T_1)-(S_3-S_1)+21 \text{ ms.}$$

The difference of the second equation and the third equation would result in an equation that would determine a value of $D_{RTPRCV}$ as follows:

$$D_{RTPRCV}=(S_3-S_2)-(T_3-T_2)-21 \text{ ms.}$$

Thus, using these equations, the time it takes the VoIP device 112 to convert an RTP packet into the analog signal, $D_{RTPRCV}$, and the time it takes the VoIP device 112 to create the SIP Invite packet, $D_{SIP}$, may be determined accordingly.

Figure 3:
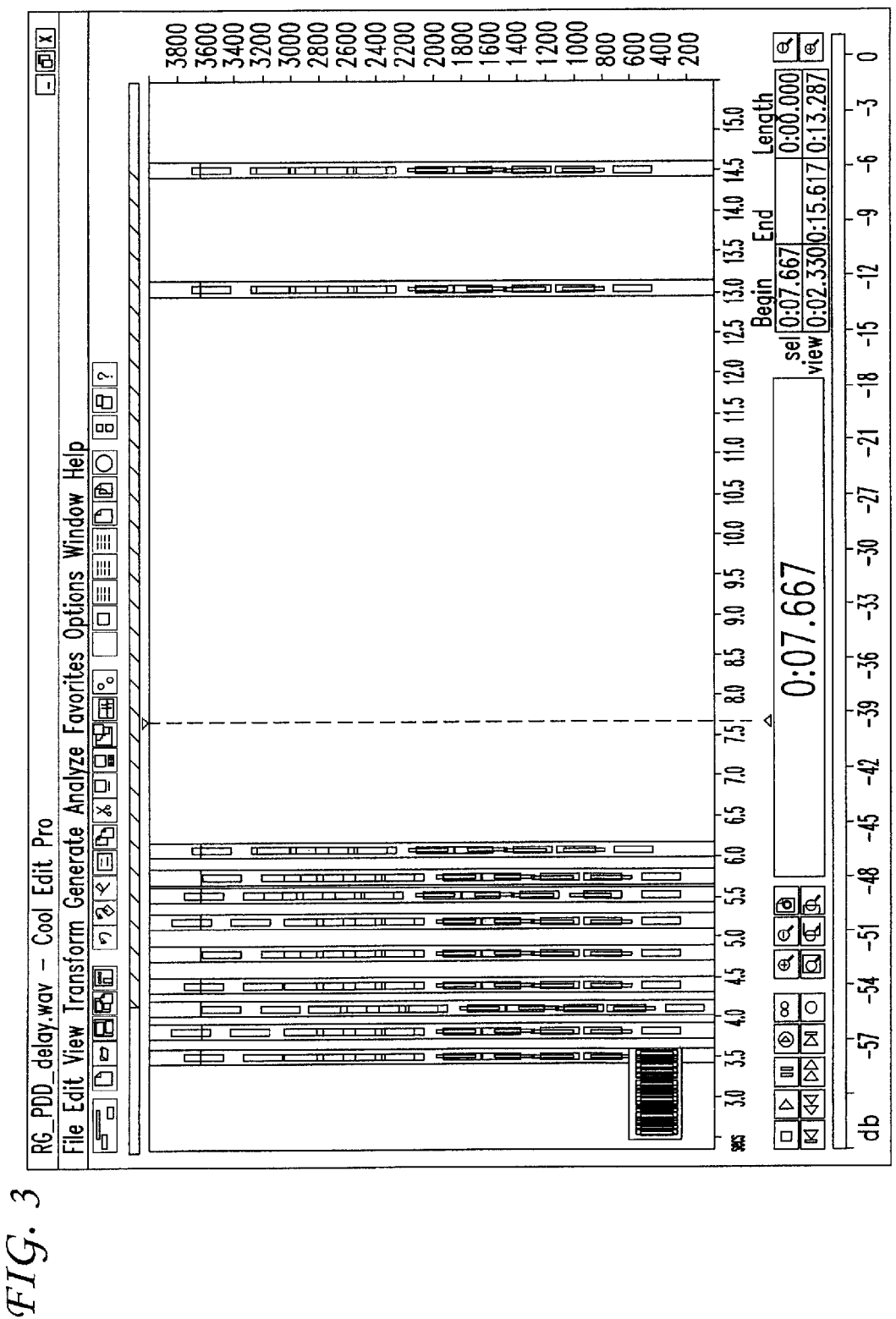
FIG. 3 shows a screen view of an exemplary analog recording according to an exemplary system and method of the present invention.

For example, FIG. 3 shows a screenshot of an exemplary analog recording according to the present invention. In the example shown, the last DTMF digit was dialed at approximately 6 seconds, the ringing signal starts at approximately 13 seconds and the transmitted signal starts at approximately 14.4 seconds. Since the equations above are measures in milliseconds, the values of $T_1$=6000 ms, $T_2$=13000 ms and $T_3$=14200 ms may be used in the above equations.

FIGS. 4A-4C show a series of screenshots of an exemplary packet capture using Wireshark. As shown in FIG. 4A, packet no. 44, a SIP Invite is sent from the telephone network device 110 to the VoIP device 112 at approximately 56.8 seconds. Thus, $S_1$=56800 ms. The values of $S_2$ and $S_3$ may be determined by evaluating the payloads of the transmitted and received RTP packets in the capture. When no signal is being transmitted, the payload shows a repetitive sequence of hexadecimal values, which indicates that the channel is idle or that there is a low level noise present in the channel. As shown in FIG. 4B, the payload begins to transition from a repeating pattern to a varying pattern, indicating that a signal is being transmitted. Based on this assessment of the payload, it can be determined that packet no. 631 shows the first RTP packet of the ringing signal that is sent from the VoIP device 112 to the telephone network device 110 at approximately 63.6 seconds. Evaluating the payload of FIG. 4C in a similar manner, it may be determined that packet no. 796 shows the RTP packet being transmitted from the telephone network device 110 to the VoIP device 112 at approximately 65.2 seconds. Thus, the values of $S_2$=63600 ms and $S_3$=65200 ms may be used in the equations above. Alternatively, it will be understood by those of skill in the art that the values of $S_2$ and $S_3$ may be determined by converting the RTP packets' payloads to an audio file and using a recording device such as Cooledit to determine when audio begins in each direction.

Using the exemplary time values of FIGS. 3 and 4A-4C we may calculate $D_{SIP}$ and $D_{RTPXMT}$ as follows:

$$D_{SIP}=(T_3-T_1)-(S_3-S_1)+21 \text{ ms}$$

$$D_{SIP}=(14400 \text{ ms}-6000 \text{ ms})-(65200 \text{ ms}-56800 \text{ ms})+21 \text{ ms}$$

$$D_{SIP}=8400 \text{ ms}-8400 \text{ ms}+21 \text{ ms}$$

$$D_{SIP}=21 \text{ ms}$$

$$D_{RTPRCV}=(S_3-S_2)-(T_3-T_2)-21 \text{ ms}$$

$$D_{RTPRCV}=(65200 \text{ ms}-63600 \text{ ms})-(14400 \text{ ms}-13000 \text{ ms})-21 \text{ ms}$$

$$D_{RTPRCV}=1600 \text{ ms}-1400 \text{ ms}-21 \text{ ms}$$

$$D_{RTPRCV}=179 \text{ ms}$$

Thus, based on the exemplary values determined by evaluating the packet capture and the analog recording, the values of $D_{SIP}$, the processing time used by the VoIP device 112 to create the SIP Invite, and the $D_{RTPXMT}$, the processing time it takes to convert the signal received from the telephone network device 110 to the RTP packet, may be determined. It should be noted, however, that the above values are exemplary values only.

As can be seen from the above examples, the exemplary embodiments allow for the use of separate capture devices in the analog domain (e.g., the analog recording device) and the IP domain (e.g., the packet capture device) to take advantage of the functionality of these devices. However, the exemplary embodiments call for a common reference time for a signal that is measured by both devices to create a relationship in the domain between the measurements of both devices, thereby allowing overall processing times to be related and determined.

It will be apparent to those skilled in the art that various modifications and variations may be made in the structure and methodology of the present invention, without departing from the spirit or scope of the invention. Thus, it is intended that the present invention cover the modifications and variations of this invention provided that they come within the scope of the appended claims and their equivalents.

What is claimed is:

1. A method, comprising:

recording analog signals exchanged between a telephone device and a Voice-over Internet Protocol ("VoIP") terminal adapter;

capturing packets exchanged between the VoIP terminal adapter and an IP network;

determining analog time values corresponding to analog characteristics of the analog signals;

determining digital time values corresponding to digital characteristics of the packets, wherein the digital characteristics include a SIP invite;

determining a common reference time for the analog time values and digital time values; and determining a processing delay for the VoIP terminal adapter based on the analog time values and the digital time values, wherein the processing delay is a processing time of the VoIP terminal adapter to create a SIP invite packet ($D_{SIP}$), wherein determining $D_{SIP}$ is based on:

$$D_{SIP}=(T_3-T_1)-(S_3-S_1)+D_{RTPXMT}, \text{ wherein,}$$

$T_1$ is a first analog time value of a first analog characteristic corresponding to when a final digit is dialed from the telephone device, $T_3$ is a second analog time value of a second analog characteristic corresponding to when a speech signal starts, $S_1$ is a first digital time value of a first digital characteristic corresponding to when the SIP invite packet was sent, $S_3$ is a second digital time value of a second digital characteristic corresponding to when the speech signal starts and $D_{RTPXMT}$ is a processing time of the VoIP terminal adapter to convert an analog signal into a digital signal.

2. The method of claim 1, wherein the analog characteristics include one of a final Dual Tone Multi-Frequency digit of a dialed telephone number, a start of a ringing and a start of a transmitted signal.

3. The method of claim 1, wherein the digital characteristics further include a start of a ringing and a start of a transmitted signal.

4. The method of claim 1, further comprising:
stopping the recording and capturing after a speech signal has been transmitted from the telephone device to the VoIP terminal adapter.

5. The method of claim 1, further comprising:
storing at least one of the analog signals and the packets in a memory.

6. The method of claim 1, further comprising:
displaying at least one of the analog signals and the packets on a display.

7. A method, comprising:
recording analog signals exchanged between a telephone device and a Voice-over Internet Protocol ("VoIP") terminal adapter;
capturing packets exchanged between the VoIP terminal adapter and an IP network:
determining analog time values corresponding to analog characteristics of the analog signals;
determining digital time values corresponding to digital characteristics of the packets;
determining a common reference time for the analog time values and digital time values; and
determining a processing delay for the VoIP terminal adapter based on the analog time values and the digital time values, wherein the processing delay is a processing time of the VoIP terminal adapter to convert a packet into an analog signal ($D_{RTPRCV}$), wherein determining $D_{RTPRCV}$ is based on:

$$D_{RTPRCV} = (S_3 - S_2) - (T_3 - T_2) - D_{RTPXMT}, \text{ wherein,}$$

$S_2$ is a first digital time value of a first digital characteristic corresponding to when a ringing signal starts, $S_3$ is a second digital time value of a second digital characteristic corresponding to when a s speech signal starts, $T_2$ is a first analog time value of a first analog characteristic corresponding to when the ringing signal starts, $T_3$ is a second analog time value of a second analog characteristic corresponding to when the speech signal starts, and $D_{RTPXMT}$ is a processing time of the VoIP terminal adapter to convert an analog signal into a digital signal.

8. A system measuring a processing delay of a Voice-over Internet Protocol ("VoIP") terminal adapter, comprising:
a recording device recording analog signals exchanged between a telephone device and the VoIP terminal adapter;
a packet trace device capturing packets transmitted between the VoIP terminal adapter and an IP network; and
a processor determining analog time values corresponding to analog characteristics of the analog signals, determining digital time values corresponding to digital characteristics of the packets, wherein the digital characteristics include a SIP invite, determining a common reference time for the analog time values and digital time values and determining a processing delay for the VoIP terminal adapter based on the analog time values and the digital time values, wherein the processing delay is a processing time of the VoIP terminal adapter to create a SIP invite packet ($D_{SIP}$), wherein determining $D_{SIP}$ is based on:

$$D_{SIP} = (T_3 - T_1) - (S_3 - S_1) + D_{RTPXMT}, \text{ wherein,}$$

$T_1$ is a first analog time value of a first analog characteristic corresponding to when a final digit is dialed from the telephone device, $T_3$ is a second analog time value of a second analog characteristic corresponding to when a speech signal starts, $S_1$ is a first digital time value of a first digital characteristic corresponding to when the SIP invite packet was sent, $S_3$ is a second digital time value of a second digital characteristic corresponding to when the speech signal starts and $D_{RTPXMT}$ is a processing time of the VoIP terminal adapter to convert an analog signal into a digital signal.

9. The system of claim 8, further comprising:
a memory storing at least one of the analog signals and the packets.

10. The system of claim 8, further comprising:
a display displaying at least one of the analog signals and the packets.

11. The system of claim 8, further comprising:
a telephone tap connecting the recording device between the telephone device and the VoIP terminal adapter.

12. The system of claim 8, further comprising:
a hub connecting the packet trace device between the VoIP terminal adapter and the IP network.

13. The system of claim 8, wherein the recording device is a computing device including software for recording an audio signal.

14. The system of claim 8, wherein the packet trace device is a computing device including software for tracing packets.

15. The system of claim 8, wherein the processing delay further comprises a processing time of the VoIP terminal adapter to convert a packet into an analog signal ($D_{RTPRCV}$) and the processor determines $D_{RTPRCV}$ based on:

$$D_{RTPRCV} = (S_3 - S_2) - (T_3 - T_2) - D_{RTPXMT}, \text{ wherein,}$$

$S_2$ is a first digital time value of a first digital characteristic corresponding to when a ringing signal starts, $S_3$ is a second digital time value of a second digital characteristic corresponding to when a speech signal starts, $T_2$ is a first analog time value of a first analog characteristic corresponding to when the ringing signal starts, $T_3$ is a second analog time value of a second analog characteristic corresponding to when the speech signal starts, and $D_{RTPXMT}$ is a processing time of the VoIP terminal adapter to convert an analog signal into a digital signal.

16. A non-transitory computer readable storage medium including a set of instructions executable by a processor, the instructions performing a method comprising:
recording analog signals exchanged between a telephone device and a Voice-over Internet Protocol ("VoIP") terminal adapter;
capturing packets exchanged between the VoIP terminal adapter and an IP network;
determining analog time values corresponding to analog characteristics of the analog signals;
determining digital time values corresponding to digital characteristics of the packets, wherein the digital characteristics include a SIP invite;
determining a common reference time for the analog time values and digital time values; and
determining a processing delay for the VoIP terminal adapter based on the analog time values and the digital time values, wherein the processing delay is a processing time of the VoIP terminal adapter to create a SIP invite packet ($D_{SIP}$) wherein determining $D_{SIP}$ is based on:

$$P_{SIP}=(T_3-T_1)-(S_3-S_1)+D_{RTPXMT}, \text{wherein,}$$

$T_1$ is a first analog time value of a first analog characteristic corresponding to when a final digit is dialed from the telephone device, $T_3$ is a second analog time value of a second analog characteristic corresponding to when a speech signal starts, $S_1$ is a first digital time value of a first digital characteristic corresponding to when the SIP invite packet was sent, $S_3$ is a second digital time value of a second digital characteristic corresponding to when the speech signal starts and $D_{RTPXMT}$ is a processing time of the VoIP terminal adapter to convert an analog signal into a digital signal.

* * * * *